(12) United States Patent
Kessler et al.

(10) Patent No.: US 7,936,702 B2
(45) Date of Patent: May 3, 2011

(54) INTERDOMAIN BI-DIRECTIONAL PROTOCOL INDEPENDENT MULTICAST

(75) Inventors: Andrew Kessler, San Ramon, CA (US); Lorenzo Vicisano, Berkeley, CA (US); Daniel Alvarez, Pleasanton, CA (US); Toerless Eckert, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1152 days.

(21) Appl. No.: 11/291,405

(22) Filed: Dec. 1, 2005

(65) Prior Publication Data

US 2007/0127473 A1 Jun. 7, 2007

(51) Int. Cl.
*H04L 12/28* (2006.01)
*G06F 15/173* (2006.01)

(52) U.S. Cl. .......................... 370/256; 709/242
(58) Field of Classification Search .................. None
See application file for complete search history.

(56) References Cited

U.S. PATENT DOCUMENTS

| | | | |
|---|---|---|---|
| 6,182,147 B1 * | 1/2001 | Farinacci | 709/238 |
| 6,611,872 B1 * | 8/2003 | McCanne | 709/238 |
| 6,647,020 B1 * | 11/2003 | Maher et al. | 370/432 |
| 6,785,254 B2 * | 8/2004 | Korus et al. | 370/338 |
| 6,831,917 B1 * | 12/2004 | Cheriton | 370/392 |
| 6,853,639 B1 * | 2/2005 | Watanuki et al. | 370/390 |
| 6,894,990 B1 * | 5/2005 | Agarwal et al. | 370/321 |
| 6,937,574 B1 * | 8/2005 | Delaney et al. | 370/254 |
| 7,360,084 B1 * | 4/2008 | Hardjono | 713/163 |
| 7,418,003 B1 * | 8/2008 | Alvarez et al. | 370/432 |
| 7,489,684 B2 * | 2/2009 | Aboukarr et al. | 370/390 |
| 7,519,662 B2 * | 4/2009 | Watkinson | 709/204 |
| 7,570,605 B1 * | 8/2009 | Aggarwal et al. | 370/256 |
| 7,590,115 B1 * | 9/2009 | Aggarwal et al. | 370/390 |
| 2002/0067724 A1 * | 6/2002 | Helm et al. | 370/390 |
| 2002/0097728 A1 * | 7/2002 | Hinderks et al. | 370/395.52 |

(Continued)

OTHER PUBLICATIONS

Handley, Mark et al., Bi-Directional Protocol Independent Multicast (BIDIR-PIM), which is described in Internet Engineering Task Force—Internet Draft, draft-ietf-pim-Bidir-08.txt, published on Oct. 22, 2005; expires Apr. 2006; pp. 1-46.

*Primary Examiner* — Ayaz R Sheikh
*Assistant Examiner* — Timothy J Weidner
(74) *Attorney, Agent, or Firm* — Campbell Stephenson LLP (57) ABSTRACT

Facilitating Bi-Directional PIM communication between hosts in different multicast domains. A first rendezvous point (RP) router contained in a first multicast domain receives a first control packet. The first control packet includes a first multicast destination address G1. In response to receiving the first control packet, the first RP router generates a second control packet. This second control packet includes a second multicast destination address G2, wherein the second multicast destination address G2 is distinct from the first multicast IP address G1. After the second control packet is generated, the first RP router transmitting the second control packet toward a second RP router contained in a second multicast domain. The second control packet initiates a distribution tree building process between the first and second RP routers. This distribution tree can be used to transmit multicast data packets between the first and second RP routers. For example, first RP router encapsulates multicast data packets it receives from sources in the first RP router's domain. The first RP router then transmits the encapsulated packets to the second RP via the distribution tree. The second RP router receives the encapsulated packets. The second RP router decapsulates the packets to produce the multicast data packets, which are subsequently distributed to hosts within the second RP router's domain.

22 Claims, 9 Drawing Sheets

U.S. PATENT DOCUMENTS

| | | | |
|---|---|---|---|
| 2003/0018715 A1* | 1/2003 | O'Neill | 709/204 |
| 2003/0104807 A1* | 6/2003 | Momona | 455/422 |
| 2003/0193958 A1* | 10/2003 | Narayanan | 370/400 |
| 2004/0022244 A1* | 2/2004 | Boers et al. | 370/390 |
| 2004/0100983 A1* | 5/2004 | Suzuki | 370/432 |
| 2004/0122890 A1* | 6/2004 | Watkinson | 709/203 |
| 2004/0205215 A1* | 10/2004 | Kouvelas et al. | 709/231 |
| 2005/0157741 A1* | 7/2005 | Wu et al. | 370/432 |
| 2005/0163146 A1* | 7/2005 | Ota et al. | 370/432 |
| 2005/0190765 A1* | 9/2005 | Gotoh et al. | 370/390 |
| 2005/0213525 A1* | 9/2005 | Grayson et al. | 370/312 |
| 2006/0018253 A1* | 1/2006 | Windisch et al. | 370/216 |
| 2006/0018333 A1* | 1/2006 | Windisch et al. | 370/432 |
| 2006/0041688 A1* | 2/2006 | Wright et al. | 709/249 |
| 2006/0072572 A1* | 4/2006 | Ikeda et al. | 370/390 |
| 2006/0159091 A1* | 7/2006 | Boers et al. | 370/390 |
| 2006/0159092 A1* | 7/2006 | Boers et al. | 370/390 |
| 2006/0164984 A1* | 7/2006 | Rao et al. | 370/230 |
| 2006/0182049 A1* | 8/2006 | Rokui | 370/312 |
| 2006/0209831 A1* | 9/2006 | Shepherd et al. | 370/392 |
| 2006/0221861 A1* | 10/2006 | Previdi et al. | 370/254 |
| 2006/0221958 A1* | 10/2006 | Wijnands et al. | 370/389 |
| 2006/0221962 A1* | 10/2006 | Previdi et al. | 370/390 |
| 2006/0224922 A1* | 10/2006 | Radulescu et al. | 714/30 |
| 2006/0262792 A1* | 11/2006 | Rokui | 370/390 |
| 2006/0268869 A1* | 11/2006 | Boers et al. | 370/390 |
| 2006/0274720 A1* | 12/2006 | Adams et al. | 370/351 |
| 2007/0025276 A1* | 2/2007 | Zwiebel et al. | 370/256 |
| 2007/0025277 A1* | 2/2007 | Sajassi et al. | 370/256 |
| 2007/0058646 A1* | 3/2007 | Hermoni | 370/401 |
| 2007/0091827 A1* | 4/2007 | Boers et al. | 370/255 |
| 2007/0091891 A1* | 4/2007 | Zwiebel et al. | 370/390 |
| 2007/0127473 A1 | 6/2007 | Kessler et al. | 370/390 |
| 2007/0147372 A1* | 6/2007 | Liu et al. | 370/390 |

* cited by examiner

| RP Router 35a | RP Router 35b | RP Router 35c |
|---|---|---|
| $(*, G2_{BD})$: I1 | $(*, G2_{BD})$: $VIG2_{SSM}$ | $(*, G2_{BD})$: $VIG2_{SSM}$ |
| $(SRPb, G2_{SSM})$: $VIG2_{BD}$ | $(SRPb, G2_{SSM})$: I1 | $(SRPc, G2_{SSM})$: I1 |
| $(SRPc, G2_{SSM})$: $VIG2_{BD}$ | | |

*FIG. 9A*

| RP Router 35a | RP Router 35b | RP Router 35c |
|---|---|---|
| $(*, G2_{BD})$: I1, $VIG2_{SSM}$ | $(*, G2_{BD})$: $VIG2_{SSM}$ | $(*, G2_{BD})$: $VIG2_{SSM}$, I3 |
| $(SRPa, G2_{SSM})$: I3 | $(SRPb, G2_{SSM})$: I1, I3 | $(SRPc, G2_{SSM})$: I1 |
| $(SRPb, G2_{SSM})$: $VIG2_{BD}$ | | $(SRPa, G2_{SSM})$: $VIG2_{BD}$ |
| $(SRPc, G2_{SSM})$: $VIG2_{BD}$ | | $(SRPb, G2_{SSM})$: $VIG2_{BD}$ |

INTERDOMAIN BI-DIRECTIONAL PROTOCOL INDEPENDENT MULTICAST

BACKGROUND OF THE INVENTION

Multicast communication enables simultaneous transmission of data packets between a source and select receivers (i.e., those receivers belonging to a multicast group) via a packet-switched network. Data packets are forwarded to receivers through a multicast distribution tree that consists of one or more network nodes. For purposes of explanation only, the term node will mean a router or a device that functions as a router, it being understood that the term node should not be limited thereto. Routers in a distribution tree are responsible for replicating data packets at each bifurcation point, i.e., the point of the tree where branches fork. This means that only one copy of the data packets travel over any particular communication link in the network, making multicast distribution trees extremely efficient for distributing the same information to many receivers.

BRIEF SUMMARY OF THE INVENTION

There are several different multicast protocol standards that enable multicast communication, including but not limited to Protocol Independent Multicast (PIM)—Sparse Mode (SM), which is described in Internet Engineering Task Force Request for Comments 2362 entitled "Protocol Independent Multicast-Sparse Mode: Protocol Specification," published in June 1998, and Bi-Directional PIM (Bidir PIM), which is described in Internet Engineering Task Force—Internet Draft, draft-ietf-pim-Bidir-08.txt, published on Oct. 22, 2005, both of which are hereby incorporated by reference in their entirety. Subsequent revisions of these documents are also incorporated herein by reference in their entirety.

In both Bidir PIM and PIM-SM, sources transmit their multicast group addressed data packets towards a rendezvous point (RP). RPs forward multicast data packets to receivers of a multicast group via a shared distribution tree. In a sense, RPs act like meeting places for sources and receivers as will be more fully described below. Routers typically function as RPs, and the present invention will be described with reference to routers acting as RPs it being understood that the present invention should not be limited thereto.

Bidir PIM and PIM-SM enabled networks create shared distribution trees through which multicast data packets travel to receivers of a multicast group. Some differences exist between shared distribution trees for Bidir PIM and PIM-SM. In Bidir PIM, the shared distribution trees are Bidirectional to enable each host (source or receiver) to communicate with all other hosts of the Bidir PIM multicast group. In contrast the shared distribution tree is unidirectional for PIM-SM communication to enable a flow of data packets only from sources to receivers of a PIM-SM multicast group. The creation of the shared distribution trees for Bidir PIM and PIM-SM, however, are similar. When creating a shared distribution tree or branch thereof, Bidir PIM or PIM-SM enabled routers initially may not know the IP address of the source or sources transmitting data to a multicast group. However, the routers will know the IP address of the RP router for each multicast group. Routers can learn the RP IP address for each multicast group using auto-RP or other well known techniques.

Figure 1:
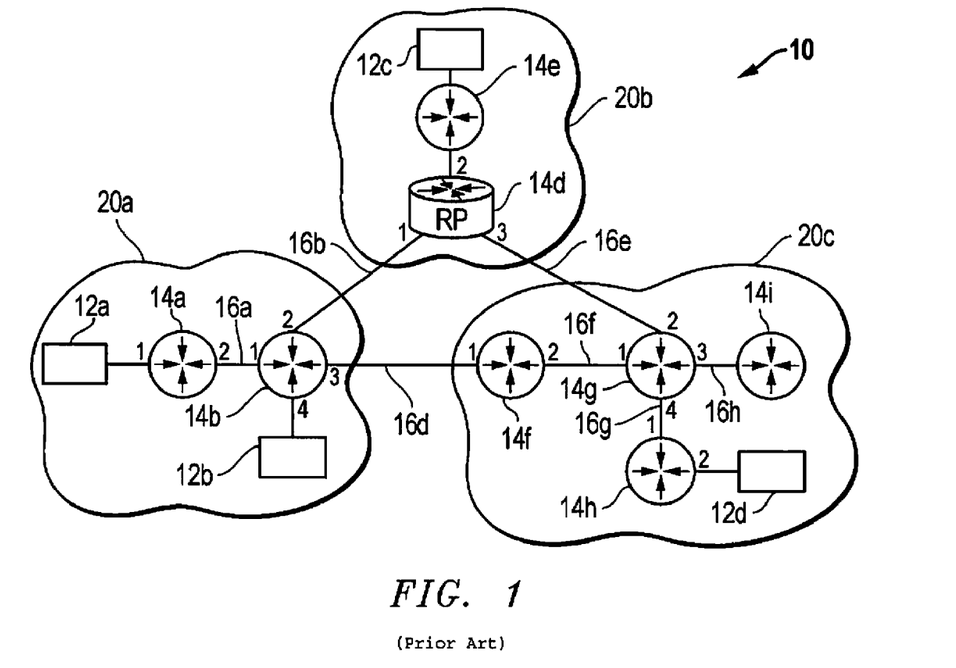
FIG. 1 is a block diagram illustrating relevant components of an exemplary network employing PIM-SM or Bidir PIM enabled routers.

Consider the exemplary enabled network 10 shown within FIG. 1 in which hosts (e.g., computer systems including servers, desk tops, etc.) 12a-12c are coupled to each other via a network of routers 14a-14i. Often times, routers within a network are geographically dispersed. To illustrate, the routers contained in group 20a are located in Asia, while the routers in groups 20b and 20c are located in the United States and Europe, respectively. Notwithstanding the geographic dispersion, routers 14a-14i are presumed to be in the same multicast domain. In general, all routers in a multicast domain recognize one router as the RP for a range of Bidir or PIM-SM multicast destination IP addresses. In other words, a multicast domain is a set of Bidir PIM or PIM-SM enabled routers that use the same RP for a range of multicast destination IP addresses. For purposes of explanation, router 14d is presumed to act as the RP for all multicast groups, including a Bidir PIM multicast destination address identified by IP address G.

As noted, Bidir PIM or PIM-SM enabled routers create shared distribution trees or branches thereof in similar, but not identical fashion. Presume host 12a seeks to join Bidir multicast group G as a receiver, and presume there is no shared distribution tree branch in existence between RP router 14d and host 12a's uplink router 14a through which multicast data packets can travel to reach host 12a. As is well known in the art, host 12a can join the multicast group and initiate the tree building process by first sending an Internet Group Management Protocol (IGMP) membership report that contains multicast group G to uplink router 14a. Uplink router 14a receives the IGMP report, and in response router 14a creates a forwarding entry for multicast group G, presuming one does not already exist. Uplink router 14a then creates and adds an output interface list (OIL) to the forwarding entry for (*, G). As will be more described below, routers use OILs to determine how to forward multicast data packets they receive. Router 14a adds the identity of interface 1, the interface that received the IGMP membership report from host 12a, to the OIL created for (*, G). The uplink router 14a also performs a reverse path forwarding (RPF) check using a routing table (not shown) and the known IP address (or prefix thereof) of RP router 14d. RPF checks are well known in the art and are used to identify the RPF interface or the interface to the next router that is topologically closest to the RP. In the illustrated example, interface 2 is identified as the RPF interface of router 14a for multicast group address G. Router 14a adds the identity of the RPF interface to the OIL created for (*, G). As an aside, in PIM-SM the identity of the RPF interface is not added to the OIL. Lastly, router 14a creates and sends a Bidir PIM (*, G) Join control packet out its RPF interface to upstream router 14b coupled thereto via communication path 16a. The "*" is a wildcard used in Bidir PIM and PIM-SM to identify any source that is transmitting multicast data packets to receivers of a multicast group (e.g., multicast group G).

Router 14b receives the Bidir PIM (*, G) Join control packet and responds in similar fashion. More particularly, router 14b creates a forwarding entry for (*, G), presuming one does not already exist. The identity of interface 1, the interface of router 14b that received the Bidir PIM (*, G) Join control packet, is added to router 14b's OIL for (*, G). Router 14b then performs an RPF check using the IP address of RP router 14d, which in turn identifies interface 2 of router 14b as the RPF interface for multicast group G. Router 14b adds the RPF interface identity to the OIL for (*, G), presuming the identity was not previously added thereto. Lastly, router 14b sends a Bidir PIM (*, G) Join control packet out its RPF interface 2 coupled to communication path 16b.

Communication path 16b is coupled between router 14b and RP router 14d. Communication path 16b may include a communication link that spans the Pacific Ocean. Although not shown, communication path 16b may also include one or more additional routers. In general the shared distribution tree branch building process described above continues with each upstream router on communication path 16b between router 14b and RP router 14d until a Bidir PIM (*, G) Join control packet reaches the RP router 14d or reaches a router in communication path 16b, which has a pre-existing forwarding entry for (*, G) with an OIL. For purposes of explanation, it will be presumed that no router in communication path 16b includes a preexisting forwarding entry for (*, G). As such, RP router 14d eventually receives a Bidir PIM (*, G) Join control packet on its interface 1.

RP router 14d creates a forwarding entry for (*, G), presuming one does not exist, in response to receiving the Bidir PIM (*, G) Join control packet. RP router 14d adds the identity of interface 1, the interface upon which the Bidir PIM (*, G) Join control packet was received, to the OIL. Adding the identity of interface 1 to the OIL completes the construction of the shared tree branch between RP router 14d and host 12a. Thereafter, multicast data packets with destination addresses set to G can flow from the RP router 14d to host 12a via the shared distribution tree branch that includes routers 14a and 14b as will be more fully described below.

Sources can transmit data packets to all hosts that have joined a multicast group as receivers via a shared distribution tree rooted at an RP. To illustrate, presume host 12b is a source of data packets for receivers of Bidir PIM multicast group G. Each of the data packets generated by host 12b includes the IP address G as the packet's destination. Host 12b transmits its data packets to its uplink router 14b. In general, when a Bidir PIM enabled router receives a multicast data packet (i.e., a multicast data packet with its destination address set to a multicast IP address), the router will forward a copy of the multicast data packet out of each interface identified in an OIL corresponding to the data packet's multicast destination IP address, except the interface on which the router received the multicast data packet. Uplink router 12b has a preexisting OIL for (*, G) by virtue of the tree branch building process described above. This OIL includes the identities of interfaces 1 and 2. Thus, when router 14b receives the multicast data packet from source 12b with a destination address set to G, router 14b forwards a copy of the multicast data packet out of its interfaces 1 and 2 in accordance with its OIL for (*, G). The copy of the multicast packet forwarded out of interface 1 is eventually received by host 12a via router 14a, while the copy of the multicast packet forwarded out of interface 2 is eventually received by RP router 14d via communication path 16b.

RP router 14d will forward a copy of each G addressed multicast data packet it receives out of each interface identified in its OIL for (*, G), except the interface upon which the multicast data packet was received. For example, if host 12c had joined multicast group G as a receiver, then RP router 14d's (*, G) OIL would include the identify of interface 2, and accordingly RP router 14d would forward to host 12c via interface 2, a copy of all multicast data packets with a destination address of G that RP router 14d receives. As a further example, if host 12d had joined multicast group G as a receiver, RP router 14d's OIL for (*, G) would include an identity of interface 3, and accordingly RP router 14d would forward a copy of all multicast data packets with a destination address of G to host 12d via interface 3, and this is true even if a more efficient data path exists between source 12b and receiver 12d that includes communication path 16d and router 14f. However, if no receiver other than host 12a has joined multicast group G, multicast data packets will be needlessly sent to RP router 14d via data path 16b that includes the Pacific Ocean communication link. If no receivers other than host 12a has joined multicast group G, RP router 14d may drop all multicast data packets sent to it by source 12b since RP router 14d's OIL for (*, G) includes only an identity of interface 1, the interface upon which it received the multicast data packets from source 12b.

Figure 2:
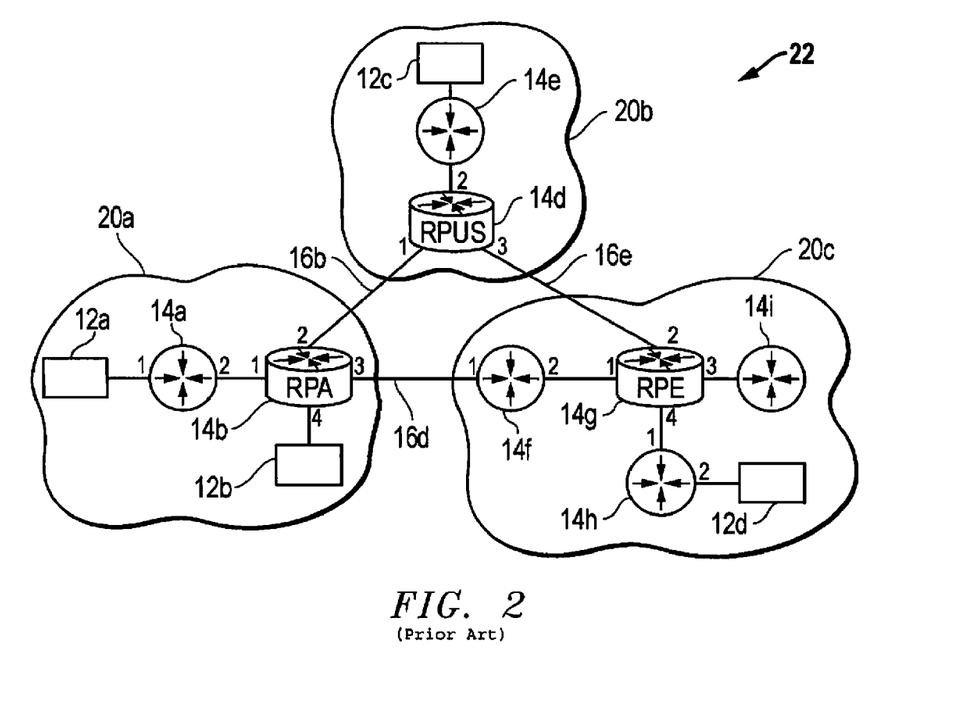
FIG. 2 illustrates the network of FIG. 1 reconfigured into distinct multicast domains.

Owners Of geographically dispersed networks often divide their networks into separate multicast domains to facilitate local administration with more efficient forwarding and convergence. FIG. 2 illustrates the network 10 of FIG. 1 with groups 20a-20c reconfigured into three separate multicast domains. More particularly, router 14d is the RP for all routers in multicast domain 20b which includes but is not limited to router 14e; router 14b is the RP for all routers in multicast domain 20a which includes but is not limited to router 14a; and router 14g is the RP for all routers in multicast domain 20c which includes but is not limited to routers 14f, 14i, and 14h. Further, router 14a has been reconfigured to recognize router 14b as its RP for each multicast group, while routers 14f, 14i, and 14h have been reconfigured to recognize router 14g as their RP for each multicast group.

In both Bidir PIM and PIM-SM, the RP is configured to serve a range of multicast groups within its multicast domain. In Bidir PIM, the RP is not responsible for knowing the identity of active sources. In PIM-SM, however, the RP is responsible for knowing all of the active sources of all multicast groups. This requirement of PIM-SM presents interesting challenges when trying to support PIM-SM communication between, for example, a source in the multicast domain 20a and a receiver in the multicast domain 20c. Multicast Source Discovery Protocol (MSDP) was developed to address these challenges. However, MSDP doesn't enable Bidir PIM communication between hosts in different multicast domains.

BRIEF DESCRIPTION OF THE DRAWINGS

The present invention may be better understood in its numerous objects, features, and advantages made apparent to those skilled in the art by referencing the accompanying drawings.

DETAILED DESCRIPTION

The present invention relates to an apparatus or method for enabling Bidir PIM communication between hosts in different multicast domains. In the following description, the preferred embodiment of the present invention could be implemented as a computer program executing on a processor of a node such as an RP router, although those skilled in the art will readily recognize that the equivalent of such software may also be constructed in hardware. If the invention is implemented as a computer program, the program may be stored in a conventional computer readable medium that may include, for example: magnetic storage media such as a magnetic disk (e.g., a floppy disk or a disk drive), or magnetic tape; optical storage media such as an optical disk, optical tape, or machine readable barcode; solid state electronic storage devices such as random access memory (RAM), or read-only memory (ROM); or any other device or medium employed to store computer program instructions.

In one embodiment, the present invention can facilitate Bidir PIM communication between hosts in separate multicast domains via source specific mode (SSM) PIM communication between RPs of the separate multicast domains. PIM-SSM is described in Internet Engineering Task Force-Internet Draft, draft-ietf-ssm-arch-07.txt, published in October 2004, which is incorporated herein by reference in its entirety. It should be understood that the present invention need not be limited to using PIM-SSM communication between RPs to facilitate interdomain Bidir communication.

PIM-SSM is an optimization of PIM-SM where data packets are forwarded to receivers from only those multicast sources to which the receivers have explicitly joined. For multicast groups configured for PIM-SSM, only SSM or source distribution trees (not shared trees) are created. As will be more fully described below, the present invention in one embodiment facilitates interdomain Bidir PIM by establishing source distribution trees between RPs. Further, hosts in separate multicast domains who have joined the same Bidir PIM multicast group, can communication with each other via the source distribution trees.

Figure 3:
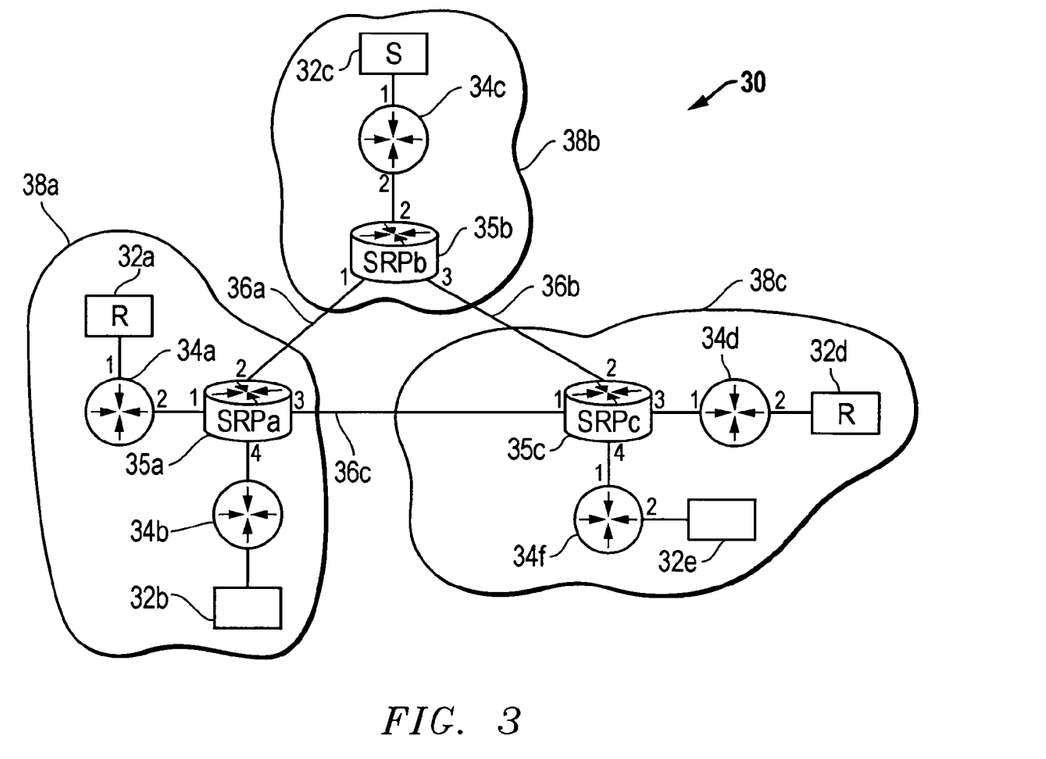
FIG. 3 is a block diagram illustrating relevant components of an exemplary network employing on embodiment of the present invention.

FIG. 3 illustrates in block diagram form relevant components of an exemplary network 30 employing one embodiment of the present invention. Specifically, FIG. 3 shows network 30 consisting of hosts 32a-32e coupled together via Bidir PIM enabled routers 34a-34f and 35a-35c. For purposes of explanation only, router 35a acts as the RP for all Bidir PIM multicast groups of multicast domain 38a which includes, but is not limited to routers 34a and 34b. Likewise, for purposes of explanation only, router 35b acts as the RP for all multicast groups of the multicast domain 38b which includes, but is not limited to router 34c. Lastly, for purposes of explanation only, router 35c acts as the RP for the multicast domain 38c which includes, but is not limited to routers 34d and 34f. Routers 35a-35c are identified by IP addresses SRPa-SRPc, respectively. RP routers 35a-35c are coupled together via communication paths 36a-36c. Each of the communication paths 36a-36c may include one or more routers (not shown). While the present invention will be described with reference to Bidir communication between two or more hosts within multicast domains 38a-38c, the present invention should not be limited thereto. For example, the present invention could be used to enable Bidir communication between hosts in two multicast domains, or the present invention can be used to enable Bidir communication between hosts in four or more multicast domains.

Figure 4:
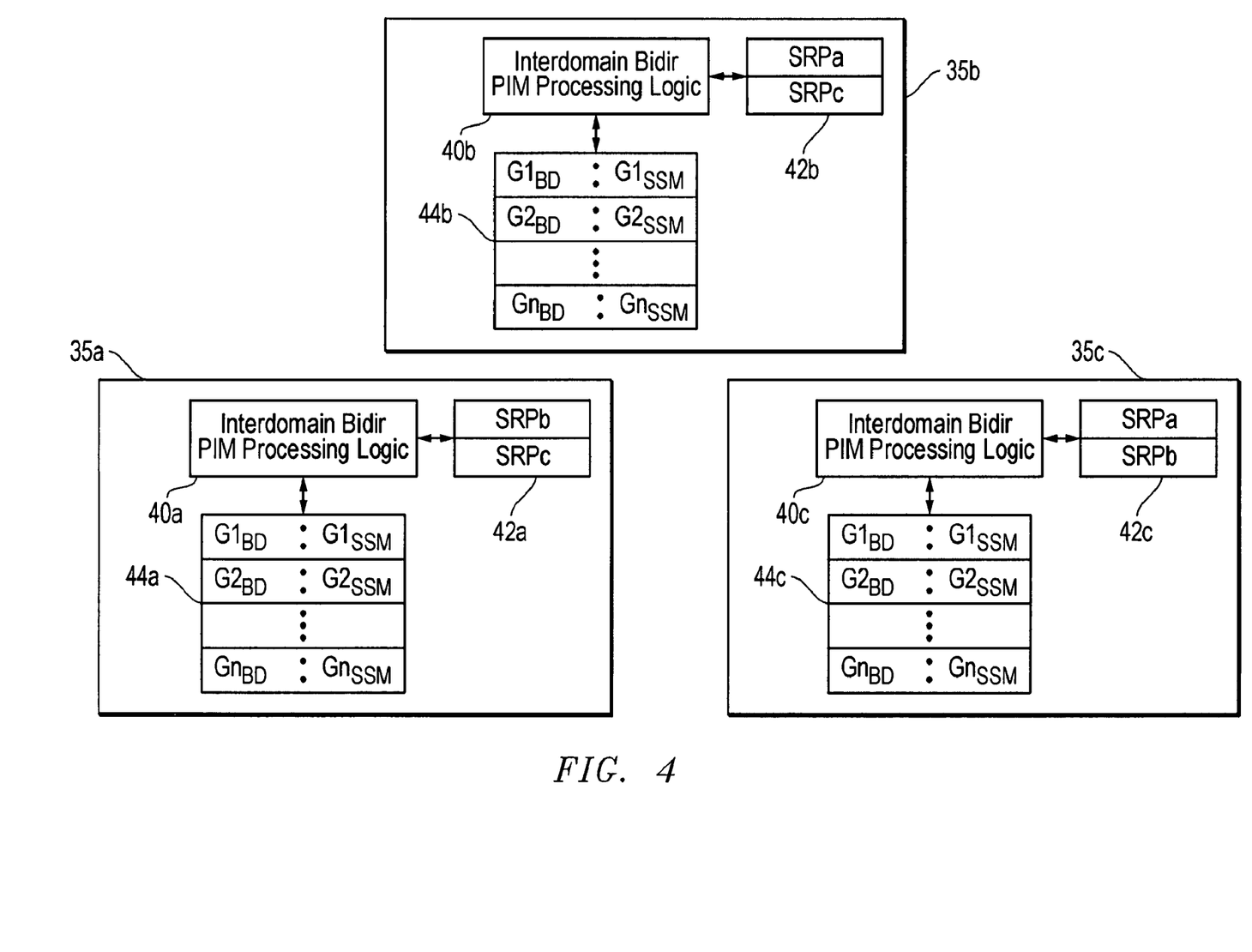
FIG. 4 is a block diagram illustrating relevant components of the RP routers shown in FIG. 3.

As noted above, the present invention can be employed in RP routers. FIG. 4 illustrates in block diagram form, relevant components of RP routers 35a-35c. Specifically, RP routers 35a-35c include interdomain Bidir PIM processing logic circuits 40a-40c, respectively, peer RP address tables 42a-42c, respectively, and multicast address mapping (MAM) tables 44a-44c, respectively. In one embodiment, each of the logic circuits 40a-40c may take form in software instructions executing on one or more processors (not shown) of RP routers 35a-35c, respectively. Each of the RP peer address tables 42a-42c and MAM tables 44a-44c may be formed in memory (not shown) of RP routers 35a-35c, respectively.

In general, the RP peer address tables contain the IP addresses of RPs in peer multicast domains. Thus, peer address table 42a contains the IP addresses SRPb and SRPc of RP routers 35b and 35c, respectively; RP peer table 42b contains the IP addresses SRPa and SRPc of RP routers 35a and 35c, respectively, and; RP peer table 42c includes as entries the IP addresses SRPa and SRPb of RP routers 35a and 35b, respectively. The RP peer tables 42a-42c are accessible by logic circuits 40a-40c, respectively. Logic circuits use of RP peer tables 42a-42c are more fully described below.

Figure 5:
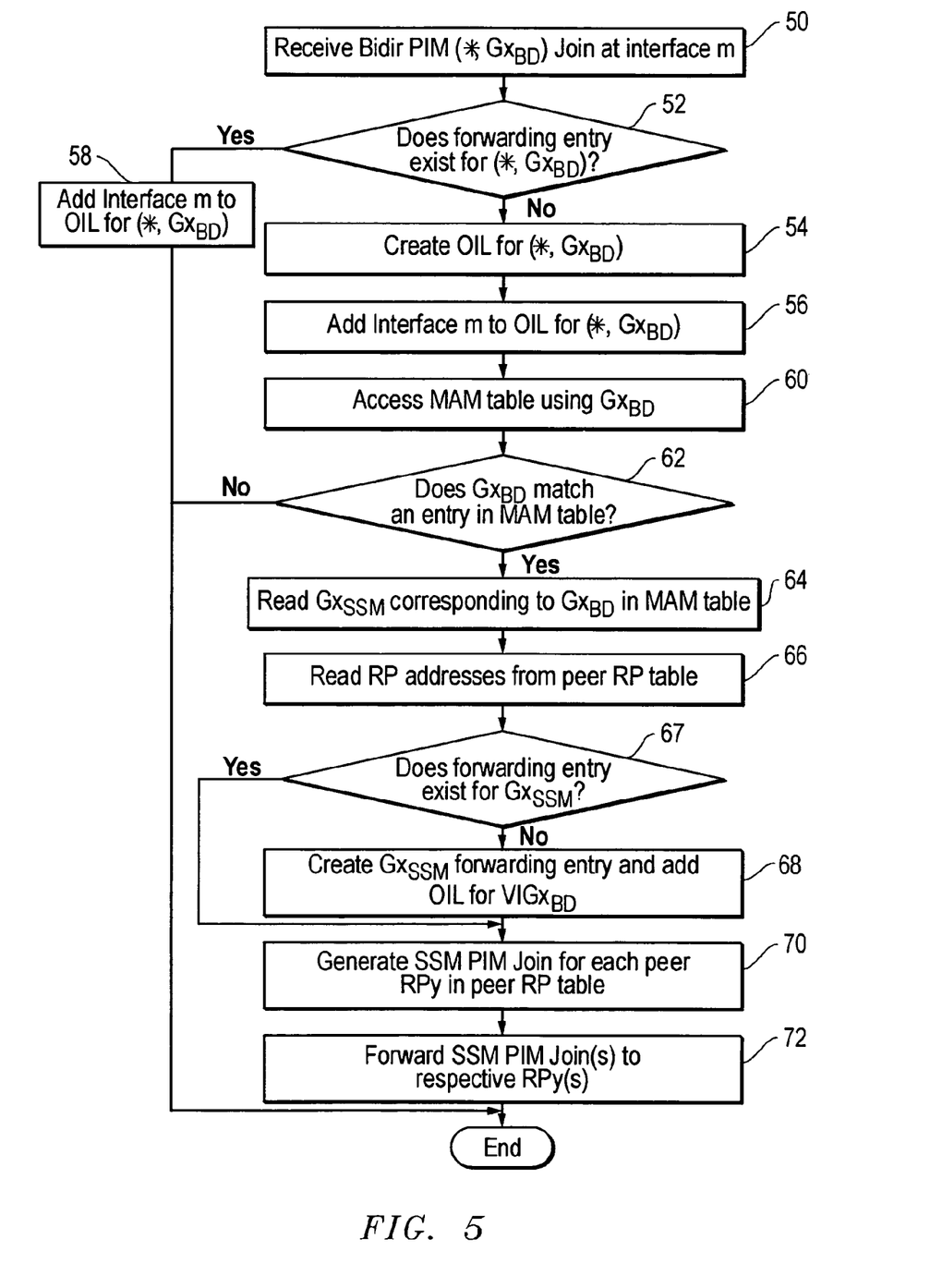
FIGS. 5 and 6 are flow charts illustrating operational aspects of creating a source distribution tree that facilitates Bidir PIM communication between hosts of different multicast domains in accordance with one embodiment of the present invention.
Figure 6:
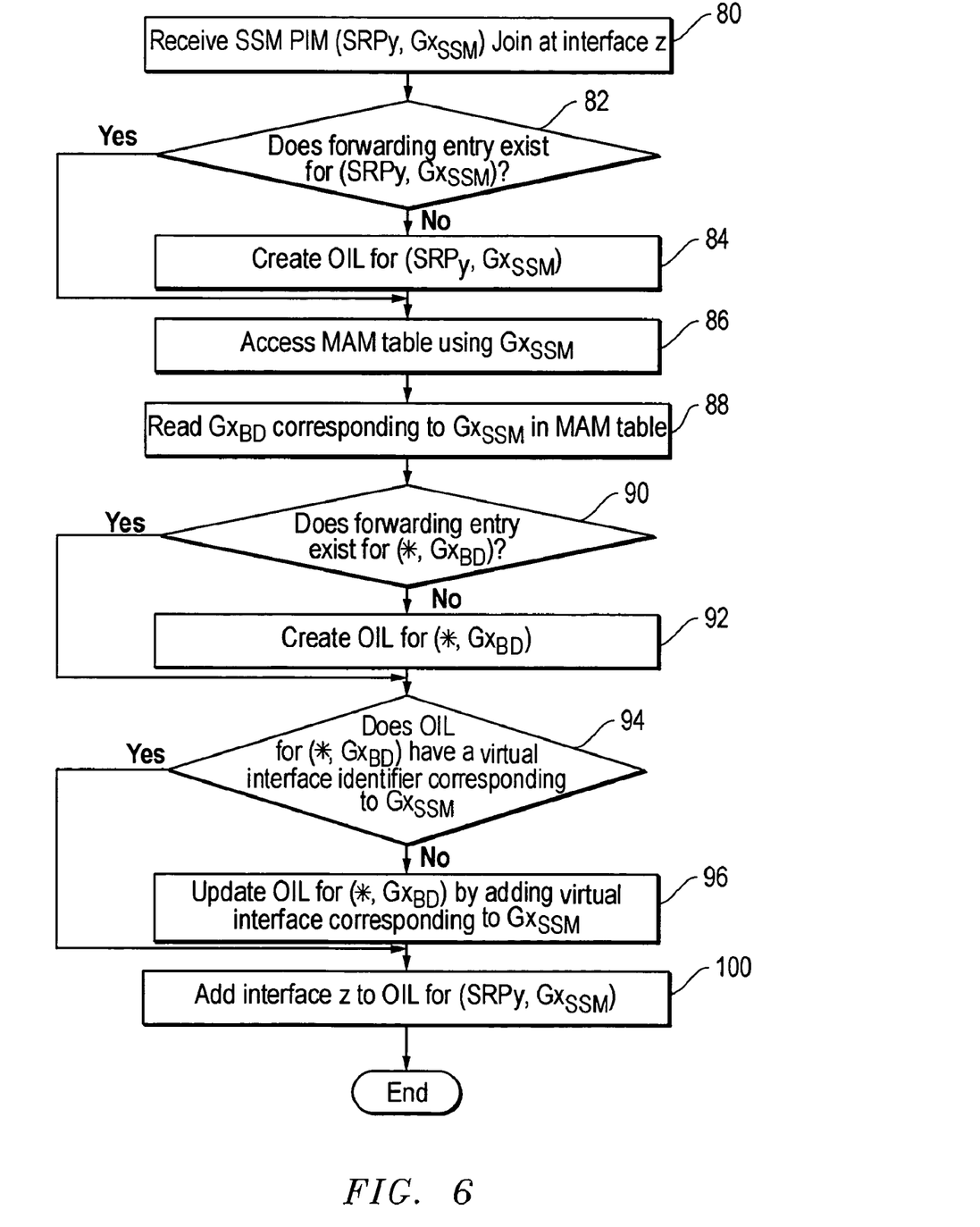

The MAM tables 44a-44c are also accessible by logic circuits 40a-40c, respectively. Each of the MAM tables 44a-44c include identical entries. Specifically, each entry of the MAM table maps a Bidir multicast group IP address $Gx_{BD}$ to a respective PIM-SSM multicast group IP address $Gx_{SSM}$. Thus, entries of MAM tables 44a-44c map Bidir PIM multicast group IP addresses $G1_{BD}$-$Gn_{BD}$ to PIM-SSM multicast group IP addresses $G1_{SSM}$-$Gn_{SSM}$, respectively. The Internet Assigned Numbers Authority (IANA) has reserved the IP address range 232.0.0.0 through 232.255.255.255 for PIM-SSM although end users can use any address in the Class D range for IP multicast. Bidir PIM has not been assigned a specific IP address range. The Bidir PIM IP address range used to implement this invention should be coordinated by administrators of each multicast domain. Logic circuits use of MAM tables 44a-44c are more fully described below In one embodiment, logic circuits 40a-40c create source distribution trees between RP routers 35a-35c to facilitate interdomain Bidir PIM communication. FIGS. 5 and 6 illustrate operational aspects performed by logic circuits 40a-40c when creating these source distribution trees. In general, the process shown in FIG. 5 initiates when one of the RP routers (e.g., RP router 35a) receives a Bidir PIM (*, $Gx_{BD}$) Join control packet at interface m as shown in step 50, where x is any number 1-n. The RP router receives the Bidir PIM (*, $Gx_{BD}$) Join control packet, for example, in response to a host (e.g., host 32a) seeking to join the Bidir PIM multicast group $Gx_{BD}$, just as RP router 14e of FIG. 1 received the Bidir PIM (*, G) Join in response to host 12a seeking to join the Bidir PIM multicast group G. In response to receiving the Bidir PIM (*, $Gx_{BD}$) Join control packet, the RP router checks to see if it has an existing forwarding entry for (*, $Gx_{BD}$) in step 52. The router's logic circuit (e.g., logic circuit 40a) creates a forwarding entry for (*, $Gx_{BD}$), if one does not exist. Further, the router's logic circuit creates and adds an OIL to the forwarding entry for (*, $Gx_{BD}$) as shown in step 52. The router's logic circuit then adds interface m (see step 50) to the OIL as shown in step 56. If a forwarding entry for (*, $Gx_{BD}$) exists in step 52 and if PIM-SSM Joins have previously been forwarded to peer RP routers in accordance with step 72 more fully described below, the router's logic circuit simply adds interface m to the forwarding entry's OIL (presuming the OIL exists) as shown in step 58 and the process ends.

In step 60, the router's logic circuit accesses its MAM table (e.g., MAM table 44a) using $Gx_{BD}$, the IP address of the Bidir PIM multicast group of interest. Specifically, the router's logic circuit accesses its MAM table to determine whether it has an entry that contains $Gx_{BD}$. If a match exists the process proceeds to step 64 where the corresponding $GX_{SSM}$ address is read and returned to the router's logic circuit. The router's logic circuit in step 66 then reads the IP addresses stored in peer RP table (e.g., peer RP table 42a). As will be more fully described below, the $Gx_{SSM}$ address and peer RP addresses will be used to create SSM Join control packets.

The router's logic circuit determines in step 66 if an SSM forwarding entry exists for each RP address read from the peer RP table. The router's logic circuit creates SSM forwarding entries if any are lacking for the RP addresses read in step 66. For example, the router's logic circuit would create a forwarding entry for (SRPc, $Gx_{SSM}$), if this forwarding entry does not exist after SRPc is read from the peer RP table 42a. Although not shown, the router's logic circuit also creates and adds an OIL to the forwarding entry. A virtual interface identifier $VIGx_{BD}$ is added to each OIL of the forwarding entries existing or created in step 67.

After steps 67 and 68, the process proceeds to step 70 where the router's logic circuit generates a PIM-SSM Join control packet for each RP address read from the peer RP table in step 66. For example, logic circuit 40a of RP router 35a would generate PIM-SSM (SRPb, $Gx_{SSM}$) and (SRPc, $Gx_{SSM}$) Join control packets in response to reading the SRPc and SRPb IP addresses, respectively, stored in the peer RP address table 42a. In step 72, the router's logic circuit forwards all PIM-SSM Join control packets it generates in step 70 toward the RP routers identified by IP addresses in the PIM-SSM Join control packets. For example, RP router 35a would send the PIM-SSM (SRPb, $Gx_{SSM}$) and (SRPc, $Gx_{SSM}$) Join control packets out of interfaces 2 and 3, respectively. The (SRPb, $Gx_{SSM}$) and (SRPc, $Gx_{SSM}$) travel router by router (or hop by hop) until they are received by RP routers 35b and 35c, respectively. Routers of communication paths 36a and 36c create forwarding entries for (SRPb, $Gx_{SSM}$) and (SRPc, $Gx_{SSM}$), respectively, in response to receiving and forwarding the (SRPb, $Gx_{SSM}$) and (SRPc, $Gx_{SSM}$) Join control packets, respectively, in a fashion similar to the creation of the (*, G) forwarding entries described in the background section above. In doing so, source distribution trees for (SRPb, $Gx_{SSM}$) and (SRPc, $Gx_{SSM}$) are created in communication paths 36a and 36c, respectively, which are subsequently used for interdomain Bidir communication, which is more fully described with reference to FIGS. 7 and 8 below.

FIG. 6 illustrates relevant operational aspects performed by RP routers in response to directly or indirectly receiving a PIM-SSM Join control packet generated by the process of FIG. 5. The process of FIG. 6 begins at step 80 when an RP router (e.g., RP router 35b) receives a PIM-SSM (SRPy, $Gx_{SSM}$) Join control packet (e.g, PIM-SSM (SRPb, $Gx_{SSM}$) Join control packet) at interface z. In response the RP router's logic circuit (e.g., logic circuit 40b) determines if a forwarding entry exists for (SRPy, $Gx_{SSM}$). The router's logic circuit creates a forwarding entry for (SRPy, $Gx_{SSM}$), if none exists. The router's logic circuit also creates and adds an OIL to the forwarding entry as shown in step 84. In step 86, the router's logic circuit accesses its MAM table (e.g., MAM table 44b) using the multicast address $Gx_{SSM}$ of the PIM-SSM (SRPy, $Gx_{SSM}$) Join control packet. Specifically, the router's logic circuit accesses its MAM table to read the Bidir PIM group multicast address $Gx_{BD}$ of the entry having the PIM-SSM multicast group address $Gx_{SSM}$. Thereafter, the router's logic circuit determines whether a forwarding entry exists for (*, $Gx_{BD}$) as shown in step 90. The router's logic circuit creates a forwarding entry for (*, $Gx_{BD}$), if none exists. An OIL would also created and added to the forwarding entry as shown in step 92. After step 92 or in response to a determination in step 90 that a forwarding entry exists for (*, $Gx_{BD}$), the router's logic circuit determines whether the OIL for (*, $G_{BD}$) includes a virtual interface identifier $VIGx_{SMM}$. A virtual identifier may be a data structure that is used to trigger a routine (described below) for interdomain transmission of Bidir PIM multicast group addressed data packets. If the OIL for (*, $Gx_{BD}$) lacks the virtual interface identifier $VIGx_{SMM}$, the process will proceed to step 96 where the router's logic circuit adds virtual interface identifier $VIGx_{SSM}$ to the OIL for (*, $G_{BD}$). In step 100 the router's logic circuit adds an identifier for interface z to the (SRPy, $Gx_{SSM}$) OIL, where interface z is the interface of the RP router that received the PIM-SSM (SRPy, $Gx_{SSM}$) Join.

Figure 7:
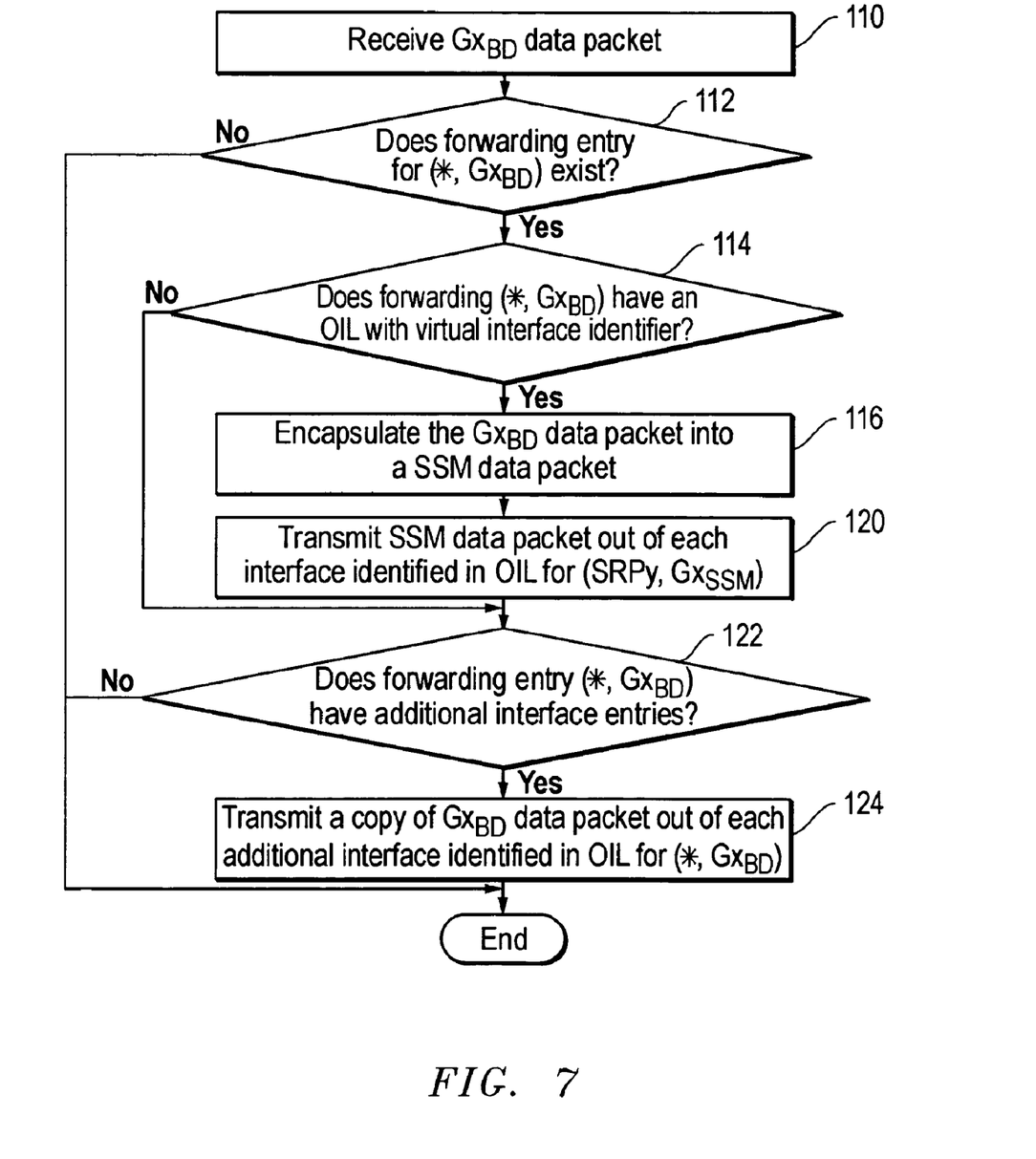
FIGS. 7 and 8 are flow charts illustrating operational aspects of transmitting data between hosts within distinct multicast domains in accordance with one embodiment of the present invention.
Figure 8:
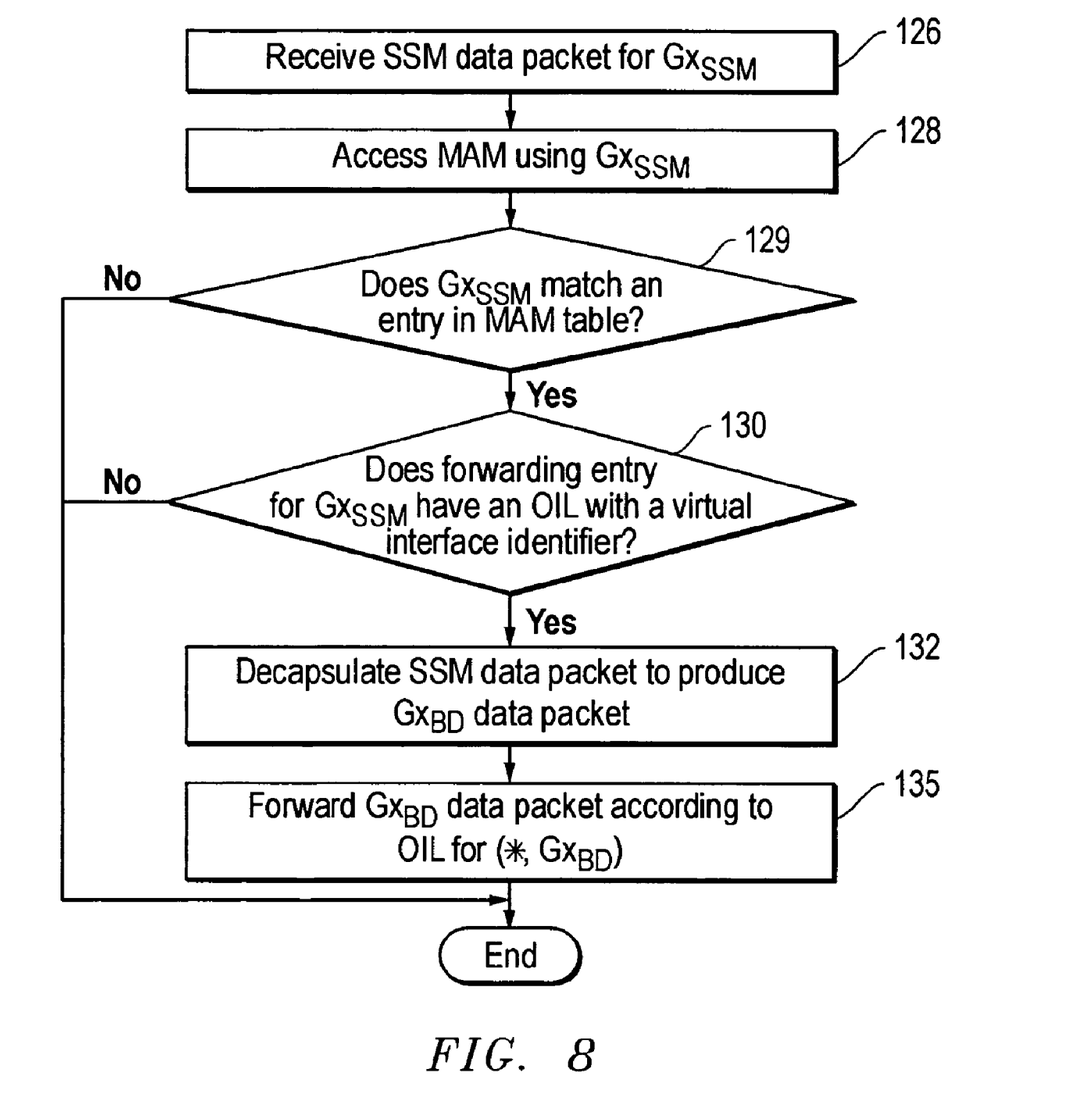

The RP routers use the source distribution tree(s) created during the processes shown in FIGS. 5 and 6 to facilitate interdomain Bidir communication. Hosts (i.e, receivers and sources) which transmit or subscribe to the same Bidir PIM multicast group $Gx_{BD}$, can communicate with each other even though they are in separate multicast domains. FIGS. 7 and 8 illustrate relevant operational aspects of this interdomain Bidir PIM communication.

The process of FIG. 7 initiates when an RP router (e.g., RP router 35b) receives a data packet. This data packet has a destination address set to a Bidir PIM multicast group $Gx_{BD}$. The data packet can be received directly or indirectly from a source (e.g., host 32c) in the RP router's multicast domain. In response to receiving the $Gx_{BD}$ addressed data packet in step 110, the RP router's logic circuit (e.g., logic circuit 40b) determines whether a forwarding entry exists for (*, $Gx_{BD}$) as shown in 112. If one does exist, the process proceeds to step 114 where the router's logic circuit determines whether the OIL for (*, $Gx_{BD}$) includes a virtual interface identifier (i.e., $VIGx_{SSM}$). If the OIL for (*, $Gx_{BD}$) does have a virtual interface identifier, then the router's logic circuit can access its MAM table (e.g., MAM table 44b) to identify the SSM multicast group address (e.g., $Gx_{SSM}$) that corresponds to the $Gx_{BD}$ address of the data packet received in step 110. In step 116, the router's logic circuit encapsulates the $Gx_{BD}$ addressed data packet into an SSM data packet. The RP router's logic circuit sets the source and destination addresses of the SSM data packet to SRPy and $Gx_{SSM}$, respectively. Thereafter, a copy of the SSM data packet generated in step 116 is transmitted out of each interface identified in the router's OIL for (SRPy, $Gx_{SSM}$) as shown in step 120. Thereafter, or in response to a determination that the (*, $Gx_{BD}$) OIL lacks a virtual interface identifier in step 114, the router's logic circuit checks the (*, $Gx_{BD}$) OIL for additional interface entries. If additional interface entries exists in the (*, $G_{BD}$) OIL, then the router's logic circuit transmits a copy of the $Gx_{BD}$ addressed data packet out of each additional interface identified in the (*, $Gx_{BD}$) OIL, other than the interface that received the data packet in step 110.

FIG. 8 illustrates the operational aspects performed by an RP router (e.g., RP router 35a) in response to receiving a SSM data packet for $Gx_{SSM}$ that was generated by step 116 of FIG. 7. It is noted that the RP router may receive the SSM data packet after it travels through several intervening routers of the source distribution tree established between the RP router that generated the SSM data packet and the RP router that receives the SSM data packet. At step 128, the router's logic circuit accesses its MAM (e.g., MAM 44a) using the multicast group address $Gx_{SSM}$ of the SSM data packet that was received at step 126. The router accesses the MAM to determine whether the destination address $Gx_{SSM}$ has a match in the MAM table. If a match does not exist, the process ends and the SSM data packet received in sep 126 is dropped. If a match does exist, then the router's logic circuit in step 130 determines whether the forwarding entry for $Gx_{SSM}$ has an OIL which includes a virtual interface. If the router's logic circuit determines in step 130 that a virtual interface identifier exists, the process proceeds to step 132, where the RP router decapsulates the SSM data packet it receives at step 126 to produce the $Gx_{BD}$ data packet. Thereafter, the $Gx_{BD}$ data packet is forwarded out of RP router interfaces that are identified in the RP router's OIL for (*, $Gx_{BD}$).

FIGS. 5-8 generally illustrate operational aspects performed by RP routers in creating source distribution trees or using those source distribution trees to facilitate multicast interdomain Bidir communication in accordance with one embodiment of the present invention. The following example of the use of the processes shown in FIGS. 5-8 may provide a better understanding of one embodiment of the present invention. To illustrate, suppose that host 32a in FIG. 3 seeks to join the Bidir PIM multicast group $G2_{BD}$ as a receiver. In response to receiving an IGMP membership report from host 32a, uplink router 34a creates a forwarding entry for (*, $G2_{BD}$), assuming one does not exist. Uplink router 34a also creates and adds an OIL to the forwarding entry. The identity of interface 1, the interface upon which router 34a received the IGMP membership report from host 32a, and the identity of interface 2, the RPF interface of RP router 35a, is added to the OIL created for (*, $G2_{BD}$). Router 34a then generates and transmits a Bidir PIM (*, $G2_{BD}$) Join control packet toward RP router 35a.

Figure 9A:
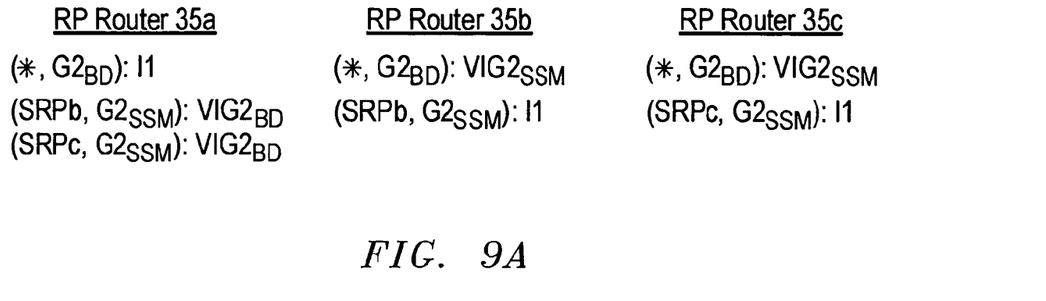
FIGS. 9a and 9b illustrate exemplary OILs of the RP routers of the network shown in FIG. 3 after creation of Source distribution trees between the RP routers.

In accordance with the process described in FIG. 5, RP router 35a creates a forwarding entry for (*, $G2_{BD}$). RP router 35a also creates and adds an OIL to the forwarding entry. The identity (e.g., I1) of interface 1, the interface of RP router 35a that received the (*, $G2_{BD}$) Join from router 34a, is added to the OIL. FIG. 9a illustrates the OIL created by RP router 35a. As can be seen the (*, $G2_{BD}$) OIL contains one entry, i.e, the identity of interface 1. In accordance with step 60, logic circuit 40a accesses MAM table 44a to read $G2_{SSM}$, the PIM-SSM multicast group address corresponding to $G2_{BD}$. Logic circuit 40a also accesses RP peer table 42a in accordance with step 66 and reads SRPb and SRPc, the IP addresses of peer RP routers 35b and 35c, respectively. Logic circuit creates forwarding entries for (SRPb, $G2_{SSM}$) and (SRPc, $G2_{SSM}$) in accordance with step 68, presuming none exist in RP router 35a for $G2_{SSM}$. OILs are created and added to each of the forwarding entries for (SRPb, $G2_{SSM}$) and (SRPc, $G2_{SSM}$). Further, virtual interface identifier $VIG2_{BD}$ is added to the OILs for (SRPb, $G2_{SSM}$) and (SRPc, $G2_{SSM}$). FIG. 9a illustrates the OILs for (SRPb, $G2_{SSM}$) and (SRPc, $G2_{SSM}$) after the virtual interface identifier $VIG2_{BD}$ is added thereto. Thereafter, logic circuit 48 generates and forwards PIM-SSM (SRPb, $G2_{SSM}$) and (SRPc, $G2_{SSM}$) Join control packets towards RP routers 35b and 35c, respectively, on communication paths 36a and 36c, respectively. It is noted that communication paths 36a and 36c may include one or more routers (not shown). The routers in these communication paths can create forwarding entries with OILs for (SRPb, $G2_{SSM}$) and (SRPc, $G2_{SSM}$), respectively, in response to receiving the PIM-SSM Join control packets directly or indirectly from RP router 35a. In doing so, source distribution trees for (SRPb, $G2_{SSM}$) and (SRPc, $G2_{SSM}$) are created in communication paths 36a and 36b, respectively. Eventually, RP routers 35b and 35c receive the PIM-SSM (SRPb, $G2_{SSM}$) and (SRPc, $G2_{SSM}$) Join control packets, respectively.

In response to receiving these PIM-SSM Join control packets, logic circuits 40b and 40c of RP routers 35b and 35c, respectively, determine whether they have forwarding entries for (SRPb, $G2_{SSM}$) and (SRPc, $G2_{SSM}$), respectively, in accordance with step 82 of FIG. 6. Logic circuits 40b and 40c create forwarding entries for (SRPb, $G2_{SSM}$) and (SRPc, $G_2SSM$), respectively, if they don't exist. The forwarding entries for (SRPb, $G2_{SSM}$) and (SRPc, $G2_{SSM}$) will include OILs. Thereafter, logic circuits 40b and 40c access their MAM tables 44b and 44c, respectively, to read the Bidir multicast group address $G2_{BD}$ corresponding to the PIM-SSM multicast group IP address $G2_{SSM}$ contained within the Join messages in accordance with steps 86 and 88 of FIG. 6. Thereafter, logic circuits 40b and 40c create forwarding entries for (*, $G2_{BD}$) that include OILs. Logic circuits 40b and 40c then add a virtual interface identifier $VIG2_{SSM}$ to their respective OILs for (*, $G2_{BD}$). FIG. 9a illustrates the OILs created for RP routers 35b and 35c. FIG. 9a shows that the virtual interface identifiers $VIG2_{SSM}$ have been added to the OILs for (*, $G2_{BD}$). Additionally, router logic circuits 40b and 40c create OILs for (SRPb, $G2_{SSM}$) and (SRPc, $G2_{SSM}$), respectively, in accordance with steps 82 and 84. FIG. 9a shows that an interface identifier (i.e., I1) of the interfaces in RP routers 35b and 35c have been added to the OILs for (SRPb, $G2_{SSM}$) and (SRPc, $G2_{SSM}$), respectively. Interface identifier I1 identifies the interfaces of RP routers 35b and 35c that received the PIM-SSM (SRPb, $G2_{SSM}$) and (SRPc, $G2_{SSM}$) Join control packets, respectively.

The OILs illustrated in FIG. 9a can be used to facilitate interdomain Bidir communication. Suppose host 32c begins transmitting data packets with a destination address set to Bidir multicast group IP address $G2_{BD}$. These data packets eventually find their way to RP router 35b. RP router 35b in response to receiving these $G2_{BD}$ addressed data packets, implements the process shown in FIG. 7. Initially, logic circuit 40b checks to see if it has a forwarding entry for (*, $G2_{BD}$). If it doesn't, the process ends. If a forwarding entry exists for (*, $G2_{BD}$), logic circuit 40b checks the OIL for (*, $G2_{BD}$) to see if it contains a virtual interface identifier. Logic circuit 40b encapsulates the $G2_{BD}$ addressed data packets into SSM data packets in accordance with step 116 after logic circuit 40b determines that an OIL exists for (*, $G2_{BD}$) and that this OIL contains a virtual interface identifier $VIG2_{SSM}$ (See FIG. 9a). The SSM data packets will include a header that identifies SRPb and $G2S_{MM}$ as the source and destination addresses, respectively. The SSM data packets are then transmitted out of interface 1, which corresponds to the interface identifier I1 of the (SRPb, $G2_{SSM}$) OIL shown in FIG. 9a. Because the (SRPb, $G2_{SSM}$) OIL within RP router 35b lacks an interface identifier other than I1, the SSM data packets are forwarded only out of interface 1 of RP router 35b. Moreover, since the (*, $G2_{BD}$) OIL in RP router 35b lacks an interface identifier other than the virtual interface identifier $VIG2_{SMM}$, RP router 35b does not forward the $G2_{BD}$ addressed data packets to other hosts (not shown) within multicast domain 38b.

The SSM data packets generated and transmitted by RP router 35b, are eventually received by RP router 35a after the SSM data packets traverse the (SRPb, $G2_{SSM}$) distribution tree previously established within communication path 36a. Logic circuit 40a decapsulates the SSM data packets to produce the $G2_{BD}$ data packets since RP router 35a has an OIL for forwarding entry (SRPb, $G2_{SSM}$) that includes virtual interface identifier $VIG2_{BD}$. Thereafter, logic circuit 40a forwards the $G2_{BD}$ data packets out of RP router 35a's interface 1 in accordance with the OIL for (*, $G2_{BD}$). Eventually, receiver 32a receives the $G2_{BD}$ data packets via the Bidirectional, shared distribution tree established through router 34a.

After host 32c begins transmitting $G2_{BD}$ addressed data packets, host 32b may begin transmitting data packets addressed to multicast group IP address $G2_{BD}$. These data packets are received by RP router 35a via router 34b. RP router 35a has OIL for (*, $G2_{BD}$) as a result of receiving the Bidir PIM (*, $G2_{BD}$) Join control packet from router 34a. Accordingly, in response to executing the process shown in FIG. 7, RP router 35a forwards out of interface 1, the $G2_{BD}$ addressed data packets received from host 32b. Importantly, because the (*, $G2_{BD}$) OIL in RP router 35a lacks a virtual interface, the $G2_{BD}$ addressed data packets it receives are not forwarded to RP router 35b or RP router 35c.

After creation of the OILs shown in FIG. 9a, router 35c can implement the process shown in FIG. 5 in response to receiving a Bidir PIM (*, $G2_{BD}$) Join control packet, after host 32d generates an IGMP membership report for joining Bidir multicast group $G2_{BD}$. Because RP router 35c has a forwarding entry for (*, $G2_{BD}$), which in turn contains an OIL, logic circuit 40c adds to its preexisting (*, $G2_{BD}$) OIL, the identity (i.e., I3) of interface 3, the interface on which the Bidir PIM (*, $G2_{BD}$) Join control packet was received in accordance with step 56. Thereafter, logic circuit 40c accesses MAM table 44c to identify the PIM-SSM multicast address that corresponds to $G2_{BD}$. Logic circuit 40c also accesses peer RP table 42c to read SRPa and SRPb, the IP addresses of RP routers 35a and 35b, respectively. In accordance with step 70, control logic 40c generates PIM-SSM (SRPa, $G2_{SSM}$) and (SRPb, $G2_{SSM}$) Join control packets. These PIM-SSM control Join packets are forwarded to RP routers 35a and 35b, respectively, via communication paths 36c and 36b, respectively. Logic circuit 40c creates forwarding entries for (SRPa, $G2_{SSM}$) and (SRPb, $G2_{SSM}$). OILs are added to these forwarding entries in RP router 35c. The routers in communication paths 36c and 36b create OILs for (SRPa, $G2_{SSM}$) and (SRPb, $G2_{SSM}$), respectively, in response to receiving and forwarding the PIM-SSM Join control packets generated and forwarded by logic circuit 40c in accordance with steps 70 and 72. In doing so, source distribution trees for (SRPa, $G2_{SSM}$) and (SRPb, $G2_{SSM}$) are created in communication paths 36a and 36b, respectively. Eventually, RP routers 35a and 35b receive the PIM-SSM (SRPa, $G2_{SSM}$) and (SRPb, $G2_{SSM}$) Join control packets, respectively.

Routers 35a and 35b update their OILs in response to receiving the PIM-SSM (SRPa, $G2_{SSM}$) and (SRPb, $G2_{SSM}$) Join control packets, respectively, in accordance with the process shown in FIG. 6. Specifically, when RP routers 35a and 35b receive the PIM-SSM (SRPa, $G2_{SSM}$) and (SRPb, $G2_{SSM}$) Join control messages, respectively, logic circuits 40a and 40b read the Bidir multicast group address corresponding to the $G2_{SSM}$ multicast address of the PIM-SSM Join control packets in accordance with step 88. OILs for (*, $G2_{BD}$) exist in each of the RP routers 35a and 35b. Router 35b has a virtual interface $VIG2_{SSM}$ in its (*, $G2_{BD}$) OIL. However, the (*, $G2_{BD}$) OIL of router 35a, lacks the virtual interface identifier. Accordingly, logic control circuit 40a adds virtual interface identifier $VIG2_{SSM}$ to its (*, $G2_{BD}$) OIL in accordance with step 96. An OIL exists for (SRPb, $G2_{SSM}$) within RP router 35b. As such, in accordance with step 100 of the process shown in FIG. 6, logic control circuit 40b adds to the OIL for (SRPb, $G2_{SSM}$), I3 the interface identifier corresponding to interface 3 of RP router 35b. RP router 35a, however, lacks an OIL for (SRPa, $G2_{SSM}$). Accordingly, logic circuit 40a creates the OIL and adds I3, interface identifier corresponding to interface 3, thereto.

Figure 9B:
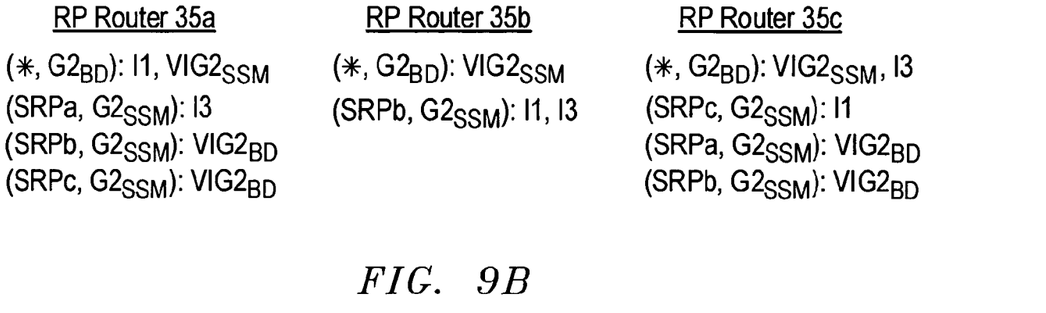

FIG. 9b illustrates the OILs for RP routers 35a-35c after RP routers 35a and 35b receive and process the (SRPa, $G2_{SSM}$) and (SRPb, $G2_{SSM}$) Join control packets, respectively. As shown, virtual interface $VIG2_{SSM}$ has been added to the OIL for (*, $G2_{BD}$) in RP router 35a. FIG. 9b also shows the creation of the (SRPa, $G2_{SSM}$) OIL in router 35a. Lastly, FIG. 9b shows that interface identifier I3 corresponding to interfaces 3 of RP routers 35a and 35b have been added to OIL (SRPa, $G2_{SSM}$) of router 35a and the OIL (SRPb, $G2_{SSM}$) of RP router 35b. Moreover, FIG. 9b shows the virtual interface identifiers added to the OILs in RP router 35c for (SRPa, $G2_{SSM}$) and (SRPb, $G2_{SSM}$).

As noted above, host 32c transmits data packets addressed to the $G2_{BD}$ multicast group. After interface identifier I3 has been added to the (SRPb, $G2_{SSM}$) OIL of RP router 35b, the $G2_{BD}$ addressed data packets received by RP router 35b are encapsulated into SSM data packets by logic circuit 40b in accordance with step 116 of FIG. 7. These SSM data packets use $G2_{SSM}$ as their destination address and SRPb as their source address. The SSM data packets are forwarded out of interfaces 1 and 3 in accordance with the OIL for (SRPb, $G2_{SSM}$) as shown in FIG. 9b, and transmitted to RP routers 35a and 35c, respectively, over the source distribution trees established within communication pass 36a and 36b, respectively. RP routers 35a and 35c decapsulate the SSM data packets they receive to produce the $G2_{BD}$ addressed data packets in accordance with step 132 of FIG. 8. RP routers 35a and 35c then forward the $G2_{BD}$ data packets out of interfaces 1 and 3, respectively in accordance with the interface identifiers of their respective (*, $G2_{BD}$) OILs. It is noted that the $G2_{BD}$ addressed data packets are not forwarded out of the virtual interfaces $VIG2_{SSM}$ identified in the (*, $G2_{BD}$) OILs.

Figure 10:
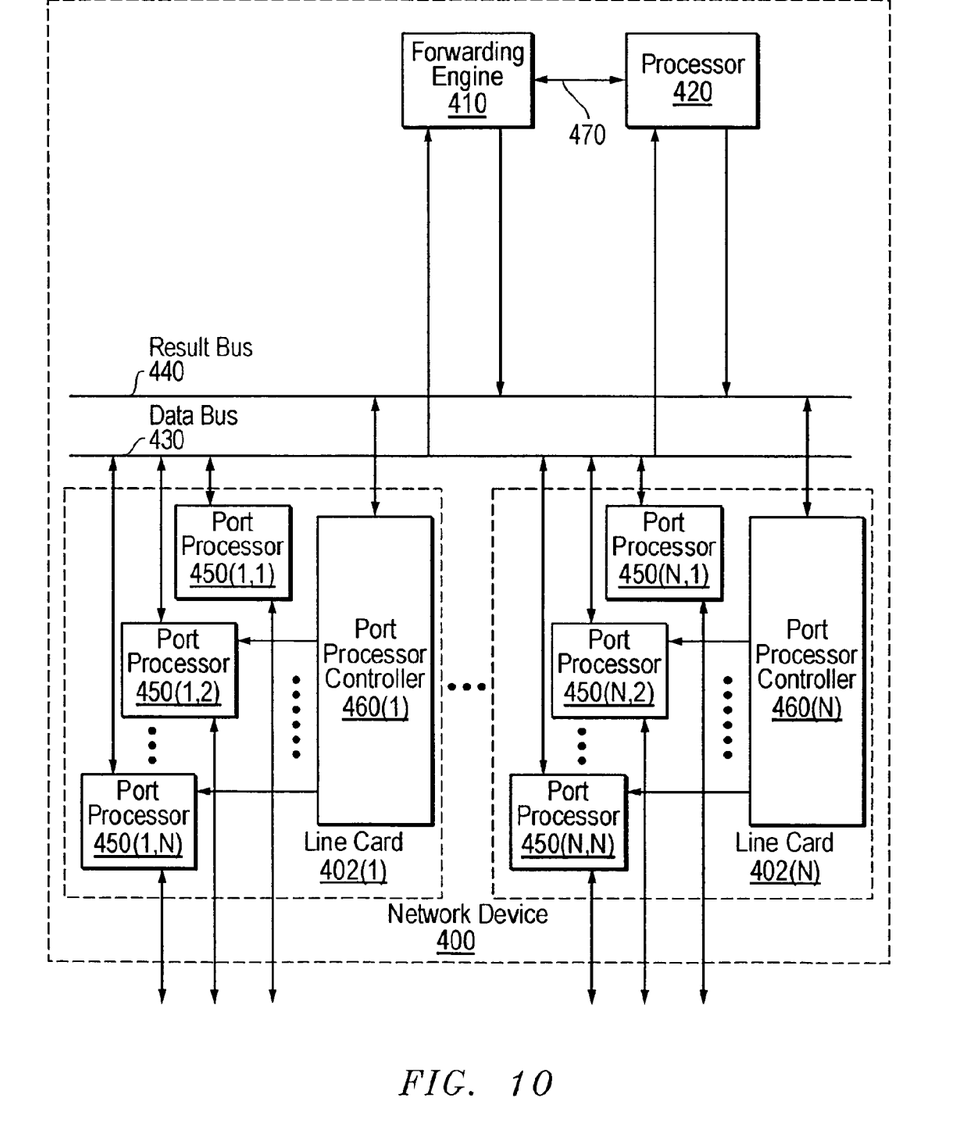
FIG. 10 is a simplified block diagram illustrating a network router element suitable for implementing embodiments of the present invention The use of the same reference symbols in different drawings indicates similar or identical items.

FIG. 10 is a simplified block diagram illustrating an example of a network routing appropriate for implementing embodiments of the present invention. In this depiction, network routing device 400 includes a number of line cards (line cards 402(1)-(N)) that are communicatively coupled to a forwarding engine 410 and a processor 420 via a data bus 430 and a result bus 440. Processor 420 executing instructions and/or forwarding engine 410 may implement any of the logic circuits 40a-40c described above. Line cards 402(1)-(N) include a number of port processors 450(1,1)-(N,N) which are controlled by port processor controllers 460(1)-(N). It will also be noted that forwarding engine 410 and processor 420 are not only coupled to one another via data bus 430 and result bus 440, but are also communicatively coupled to one another by a communications link 470.

When a packet is received, the packet is identified and analyzed by a network routing device such as network routing device 400 in the following manner, according to embodiments of the present invention. Upon receipt, a packet (or some or all of its control information) is sent from the one of port processors 450(1,1)-(N,N) at which the packet was received to one or more of those devices coupled to data bus 430 (e.g., others of port processors 450(1,1)-(N,N), forwarding engine 410 and/or processor 420). Handling of the packet can be determined, for example, by forwarding engine 410. For example, forwarding engine 410 may determine that the packet should be forwarded to one or more of port processors 450(1,1)-(N,N). This can be accomplished by indicating to corresponding one(s) of port processor controllers 460(1)-(N) that the copy of the packet held in the given one(s) of port processors 450(1,1)-(N,N) should be forwarded to the appropriate one of port processors 450(1,1)-(N,N).

In the foregoing process, network security information can be included in a frame sourced by network routing device 400 in a number of ways. For example, forwarding engine 410 can be used to detect the need for the inclusion of network security information in the packet, and processor 420 can be called into service to provide the requisite network security information. This network security information can be included in the packet during the transfer of the packet's contents from one of port processors 450(1,1)-(N,N) to another of port processors 450(1,1)-(N,N), by processor 420 providing the requisite information directly, or via forwarding engine 410, for example. The assembled packet at the receiving one of port processors 450(1,1)-(N,N) can thus be made to contain the requisite network security information.

In addition, or alternatively, once a packet has been identified for processing according to the present invention, forwarding engine 410, processor 420 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
    a first rendezvous point (RP) router receiving a Bi-Directional Protocol Independent Multicast (BiDir PIM) join packet from a router, wherein the BiDir PIM packet comprises a first multicast destination IP address G1;
    the first RP router generating a Source Specific Mode (SSM) PIM join packet in response to receiving the BiDir PIM join packet, wherein the SSM PIM join packet comprises a second multicast destination IP address G2, and wherein the second multicast destination IP address G2 is distinct from the first multicast destination IP address G1;
    the first RP router transmitting the SSM PIM join packet.

2. The method of claim 1 wherein the SSM PIM join packet comprises a second source IP address S2 wherein the second source IP address S2 corresponds to a second RP router, and wherein the first RP router transmits the SSM PIM join packet towards the second RP router.

3. The method of claim 2 further comprising:
    the second RP router creating a first output interface list (OIL) corresponding to the first multicast destination IP address G1 in response to the second RP router receiving the SSM PIM join packet directly or indirectly from the first RP router;
    the second RP router creating a second OIL corresponding to the second multicast destination IP address G2 in response to the second RP router receiving the SSM PIM join packet directly or indirectly from the first RP router.

4. The method of claim 3 further comprising:
    the second RP router receiving a multicast data packet, wherein the multicast data packet comprises the first multicast destination IP address G1;
    the second RP router encapsulating the multicast data packet to produce an encapsulated packet, wherein the encapsulated packet comprises a header, wherein the header comprises the second multicast destination IP address G2.

5. The method of claim 4 wherein the header comprises the second source IP address S2.

6. The method of claim 5 further comprising the second RP router transmitting the encapsulated packet towards the first RP router.

7. The method of claim 6 further comprising:
    the first RP router forwarding the multicast data packet to the router in response to the first RP router receiving the encapsulated packet directly or indirectly from the second RP router.

8. A system comprising:
    a first rendezvous point (RP) router contained in a first multicast domain;
    a second RP router contained in a second multicast domain, wherein the first and second RP routers are in data communication with each other;
    wherein the first RP router is configured to generate a SSM PIM Join packet in response to receiving a BiDir PIM Join packet from a router, the BiDir PIM Join packet comprising a first multicast destination IP address G1, wherein the SSM PIM Join packet comprises a second multicast destination IP address G2, and wherein the second multicast destination IP address G2 is distinct from the first multicast destination IP address G1;
    wherein the first RP router is configured to forward the SSM PIM Join packet towards the second RP router.

9. The system of claim 8 further comprising:
    a third RP router;
    wherein the first RP router is configured to generate another SSM PIM Join packet in response to receiving the BiDir PIM Join packet, wherein the other SSM PIM Join packet comprises a third source IP address S3 and the second multicast destination IP address G2, wherein the third source IP address S3 corresponds to the third RP router;
    wherein the first RP router is configured to transmit the other SSM PIM Join packet towards the third RP router.

10. The system of claim 9:
    wherein the second RP router is configured to create a first output interface list (OIL) corresponding to the first multicast destination IP address G1 in response to the second RP router receiving the SSM PIM join packet directly or indirectly from the first RP router;
    wherein the second RP router is configured to create a second OIL corresponding to the second multicast destination IP address G2 in response to the second RP router receiving the SSM PIM join packet directly or indirectly from the first RP router.

11. The system of claim 10:
    wherein the second RP router is configured to receive a multicast data packet, wherein the multicast data packet comprises the first multicast destination IP address G1;
    wherein the second RP router is configured to encapsulate the multicast data packet to produce an encapsulated packet, wherein the encapsulated packet comprises a header, wherein the header comprises the second multicast destination IP address G2;
    wherein the second RP router is configured to transmit the encapsulated packet towards the first RP router.

12. The system of claim 11 further comprising:
    a host;
    wherein the first RP router is configured to forward the multicast data packet to the router in response to the first RP router receiving the encapsulated packet directly or indirectly from the second RP router.

13. An apparatus comprising:
    a first interface configured to receive a BiDir PIM Join packet from a router, wherein the BiDir PIM Join packet comprises a first multicast destination IP address G1;
    a circuit configured to generate a SSM PIM Join packet in response to the first interface receiving the BiDir PIM Join packet, wherein the SSM PIM Join packet comprises a second multicast destination IP address G2, and wherein the second multicast destination IP address G2 is distinct from the first multicast destination IP address G1.

14. The apparatus of claim 13 further comprising:
a first table stored in memory, wherein the first table maps Bidir PIM multicast destination IP addresses to respective PIM-SSM multicast destination IP addresses;
wherein the first multicast destination IP address G1 comprises a first Bidir PIM multicast destination IP address;
wherein the second multicast destination IP address G2 comprises a first PIM-SSM multicast IP address;
wherein the first Bidir PIM multicast IP address is mapped to the first PIM-SSM multicast IP address in the first table;
wherein the circuit is configured to read the first PIM-SSM multicast destination IP address from the first table after the first interface receives the BiDir PIM Join packet and before the circuit generates the SSM PIM Join packet.

15. The apparatus of claim 14 further comprising:
a second table stored in memory, wherein the first table stores IP addresses of rendezvous point (RP) nodes;
wherein the circuit is configured to read the IP addresses from the second table after the first interface receives the BiDir PIM Join packet and before the circuit generates the SSM PIM Join packet;
wherein the SSM PIM Join packet comprises one of the IP addresses read from the second table.

16. A method comprising:
a first rendezvous point (RP) router receiving a Bi-Directional Protocol Independent Multicast (BiDir PIM) join packet from a router, wherein the BiDir PIM packet comprises a first multicast destination IP address G1;
the first RP router accessing a table to read a second multicast destination IP address G2 that is mapped to the first multicast destination IP address G1;
the first RP router generating a Source Specific Mode (SSM) PIM join packet in response to receiving the BiDir PIM join packet, wherein the SSM PIM join packet comprises the second multicast destination IP address G2, and wherein the second multicast destination IP address G2 is distinct from the first multicast destination IP address G1;
the first RP router transmitting the SSM PIM join packet.

17. The method of claim 16 wherein the SSM PIM join packet comprises a second source IP address S2 wherein the second source IP address S2 corresponds to a second RP router, and wherein the first RP router transmits the SSM PIM join packet towards the second RP router.

18. The method of claim 16 further comprising:
the first RP router generating another SSM PIM join packet in response to receiving the BiDir PIM join packet, wherein the other SSM PIM join packet comprises a third source IP address S3 and the second multicast destination IP address G2, wherein the third source IP address S3 corresponds to a third RP router;
the first RP router transmitting the other SSM PIM join packet towards the third RP router.

19. A system comprising:
a first rendezvous point (RP) router contained in a first multicast domain;
a second RP router contained in a second multicast domain, wherein the first and second RP routers are in data communication with each other;
wherein the first RP router is configured to generate a SSM PIM Join packet in response to receiving a BiDir PIM Join packet from a router, the BiDir PIM Join packet comprising a first multicast destination IP address G1, wherein the SSM PIM Join packet comprises a second multicast destination IP address G2, and wherein the second multicast destination IP address G2 is distinct from the first multicast destination IP address G1, and wherein the SSM PIM Join Packet lacks the first multicast destination IP address G1;
wherein the first RP router is configured to forward the SSM PIM Join packet towards the second RP router.

20. The system of claim 19 wherein the SSM PIM Join packet comprises a second source IP address S2 wherein the second source IP address S2 corresponds to the second RP router, and wherein the first RP router is configured to transmit the SSM PIM Join packet towards the second RP router.

21. The system of claim 19 further comprising:
a third RP router;
wherein the first RP router is configured to generate another SSM PIM Join packet in response to receiving the BiDir PIM Join packet, wherein the other SSM PIM Join packet comprises a third source IP address S3 and the second multicast destination IP address G2, wherein the third source IP address S3 corresponds to the third RP router;
wherein the first RP router is configured to transmit the other SSM PIM Join packet towards the third RP router.

22. The system of claim 21:
wherein the RP third router is configured to generate a first control packet in response to receiving a second control packet comprising the first multicast destination IP address G1, wherein the second control packet comprises the second multicast destination IP address G2;
wherein the third RP router is configured to forward the second control packet towards the first RP router.

\* \* \* \* \*